United States Patent [19]

Jackson

[11] Patent Number: 4,503,735
[45] Date of Patent: Mar. 12, 1985

[54] CHAIN SAW SHARPENING DEVICE

[75] Inventor: Robert C. Jackson, Armada, Mich.

[73] Assignee: Bebco Experimental and Manufacturing Company, Romeo, Mich.

[21] Appl. No.: 430,995

[22] Filed: Sep. 30, 1982

[51] Int. Cl.³ .............................................. B23D 63/00
[52] U.S. Cl. ................................. 76/78 R; 76/25 A;
                                                   269/249; 269/265
[58] Field of Search ............... 76/25 A, 31, 36, 78 A,
                                   76/78 R; 269/96, 246, 249, 265

[56] References Cited

U.S. PATENT DOCUMENTS

| | | | |
|---|---|---|---|
| 2,693,724 | 11/1954 | Currie | 76/31 |
| 2,889,720 | 6/1959 | Tozier | 76/78 |
| 3,083,591 | 4/1963 | Travis | 76/31 |
| 3,114,275 | 12/1963 | Paul | 76/78 |
| 3,172,306 | 3/1965 | Kephart, Jr. | 76/36 |
| 3,941,363 | 3/1976 | Ogg | 76/78 R |
| 4,040,314 | 8/1977 | Geeck | 76/78 |
| 4,248,412 | 2/1981 | DeRoy | 269/102 |
| 4,336,726 | 6/1982 | Silvey | 76/25 A |
| 4,370,905 | 2/1983 | Simington | 76/25 A |
| 4,375,173 | 3/1983 | Lesmeister | 76/78 R |

Primary Examiner—Frederick R. Schmidt
Assistant Examiner—Judy J. Hartman
Attorney, Agent, or Firm—Gifford, VanOphem, Sheridan, Sprinkle & Nabozny

[57] ABSTRACT

A clamp for sharpening chain saws does not require removal of the saw chain from the saw prior to the sharpening operation. The clamp comprises a supportive backing plate, a threaded member for fixing the saw blade into position relative to the plate, and a stop for preventing movement of the saw chain teeth along the saw blade during the sharpening operation. Preferably, the stop comprises a pivotable arm which is engageable with any one of the saw teeth.

4 Claims, 4 Drawing Figures

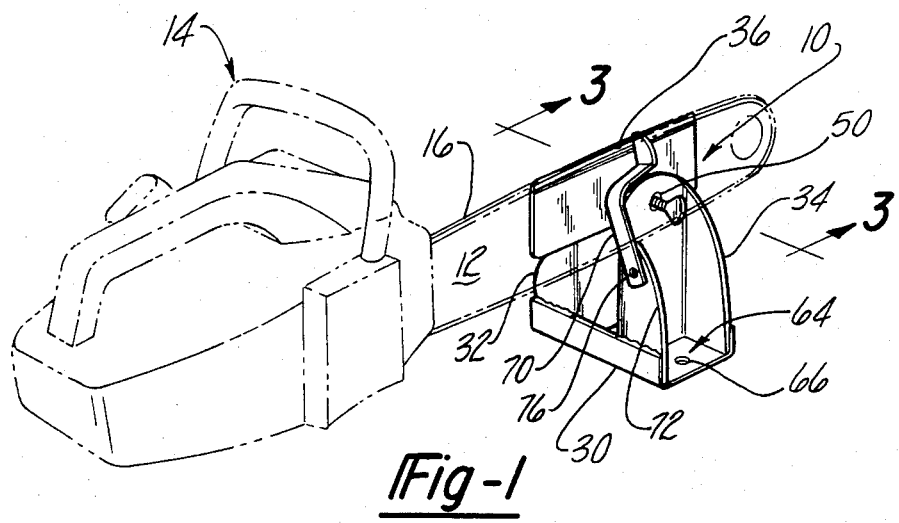
Fig-1
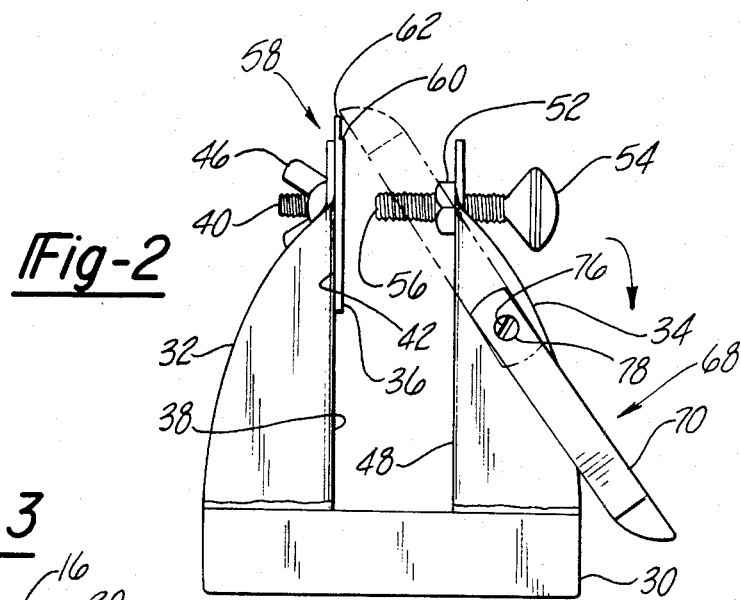
Fig-2
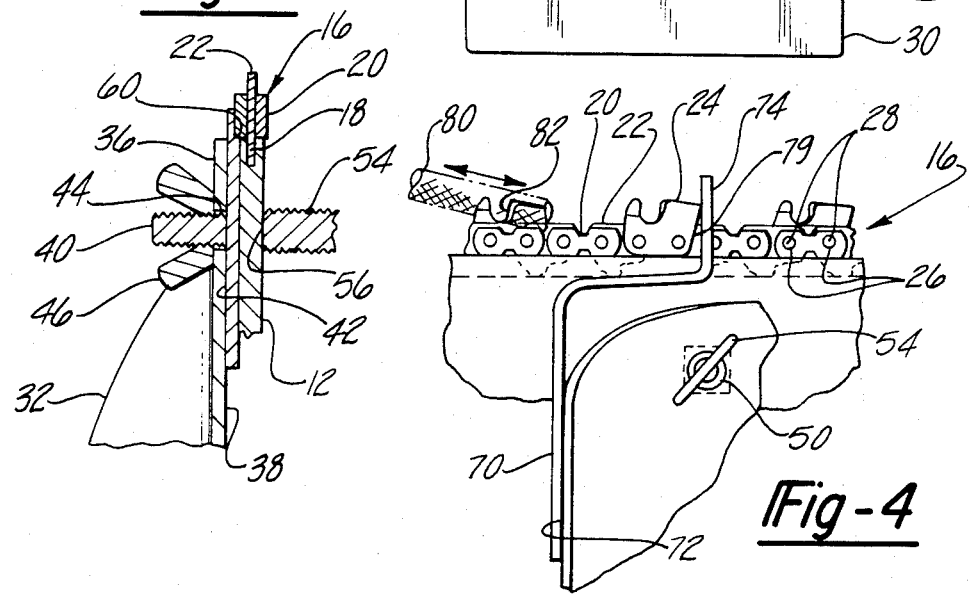
Fig-3
Fig-4

CHAIN SAW SHARPENING DEVICE

BACKGROUND OF THE INVENTION

I. Field of the Invention

The present invention is directed to a device for sharpening a chain saw, and more particularly to a device for sharpening the teeth of the saw chain without necessitating removal of the saw chain from the saw blade.

II. Description of the Prior Art

Powered chain saws have long been known in the art, and typically comprise a saw bar, a saw chain movably carried by the saw bar, means for causing rotation of the saw chain about the saw bar, and a plurality of saw teeth carried on the saw chain. Like any other saw, prolonged use of the chain saw results in dulling of the saw teeth due to contact with the substances being cut. Generally, sharpening of a drilled saw tooth only requires passing an appropriately shaped file across the cutting face of the saw tooth a few times. The problem which has arisen in how to hold the saw tooth steady during such sharpening, especially when the saw operator wishes to save time and effort by leaving the saw chain on the saw blade during sharpening of the teeth, as the task of removal of the saw chain from the saw blade is inconvenient and time consuming. No prior device has been found which attaches to the saw bar, has means for preventing motion of the saw chain and saw teeth about the saw bar during the sharpening operation, and which may easily be engaged and disengaged the saw chain so as to permit rapid movement of unsharpened teeth to a supported work position.

SUMMARY OF THE PRESENT INVENTION

The present invention makes up for this hitherto unforeseen lack of such a device by providing a clamp for use in sharpening the teeth of a chain saw, the clamp first having means for fixing the position of the saw blade to a backing plate on the clamp. The backing plate provides a supportive work surface for sharpening the saw teeth, while the saw chain remains on the saw blade. The clamp also comprises means for holding the saw chain (and thereby the saw teeth) in a fixed position relative to the saw blade, so that movement of the saw teeth along the saw blade during sharpening is prevented.

Preferably, the holding means comprises a pivoting arm attached to one of a pair of opposing clamp members, the backing plate being attached to the other of the pair. This arm carries a stop on its free end which can either rest against the edge of the saw tooth opposite the cutting face of a tooth or rest in the free space adjacent a tooth's cutting face, so that nearby teeth may be sharpened.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is a perspective view of the preferred embodiment of the present invention;

FIG. 2 is a side plan view of the preferred embodiment of the present invention;

FIG. 3 is a fragmentary cross-sectional view along line 3—3 of FIG. 1 of the preferred embodiment of the present invention; and FIG. 4 is a partial front view of the preferred embodiment of the present invention.

DETAILED DESCRIPTION OF THE PREFERRED EMBODIMENT OF THE PRESENT INVENTION

Referring now to FIG. 1, the preferred embodiment of the present invention is thereshown and comprises a clamp 10 adapted to retain a saw bar 12 of a power chain saw 14 therein. The chain saw 14 is of conventional construction, having drive means (not shown) for rotating an endless saw chain 16 in a groove 18 (FIG. 3) on the edge of the saw bar 12. As can best be seen in FIG. 4, the saw chain 16 is comprised of a repeating series of a number of linking elements 20 and a similar number of tongue elements 22, with the doubly alternating, laterally opposite linking elements 20 being replaced with a multiplicity of saw teeth 24. These elements 20 and 22 and saw teeth 24 each have a pair of holes 26 disposed therein, for passage of a link bar 28 therethrough when one of the holes 26 in one element 20 or 22 on saw tooth 24 is aligned with one of the holes 26 in the adjacent element 20 or 22 or saw tooth 24. Repeated interlinking in this fashion forms the endless saw chain 16.

The clamp 10 first comprises a base 30 of squared U-shape cross-section from which a pair of opposing jaw members 32 and 34 depend. Preferably the opposing jaw members 32 and 34 are received in the base 30 and are welded thereto.

A backing plate 36 is pivotably mounted on a face 38 of the one opposing jaw member 32. The backing plate 36 carries a threaded fastener 40 on a back face 42 thereof. The fastener 40 passes through a hole 44 in the face 38 of the one opposing jaw member 32, and a thumbnut 46 is threaded onto the fastener 40 opposite its attachment to the backing plate 36.

The other opposing jaw member 34 has a face 48 having a hole 50 therethrough opposite the hole 44. A threaded nut 52 is welded to the face 48 concentric with the hole 50. A thumbscrew 54 is threadably received in the nut 52 and has an end 56 which, when the thumbscrew 54 is tightened, is capable of trapping the saw bar 12 against the backing plate 36.

The base 30, the opposing jaw members 32 and 34, the backing plate 36, and the thumbscrew 54 thereby comprise a fixing means 58 for fixing the position of the saw bar 12 relative to the backing plate 36 during the sharpening operation. The backing plate 36 has a recess 60 formed on its upper edge 62, so that the backing plate 36 supports the saw chain 16 during sharpening of the saw teeth 24 without interfering with the free movement of the saw chain about the saw bar 12 and along the length of the recess 60. An attachment means 64 comprises a pair of holes 66 through the base, only one of the holes 66 being shown in FIG. 1 and the other of the holes 66 being similarly placed, for attachment of the clamp 10 to a supportive surface, by insertion of screws (not shown) through the holes 66 and into the surface.

The clamp 10 additionally comprises a holding means 68 which is engageable with the saw chain 16 for holding the saw chain 16 in a fixed position relative to the backing plate 36 and preventing rotation of the saw chain 16 about the saw bar 12, thereby holding the saw teeth 24 in position during the sharpening operation. The holding means comprises an arm 70 pivotably attached to a side 72 of the other opposing jaw member 34. The arm 70 has a stop 74 on the end thereof for engagement with the saw chain 16. The arm 70 is pivotably mounted on a post 76 on the side 72 of the other opposing jaw member, the post 76 passing through a hole 78 in the arm 70, and retaining the arm 70 thereon.

Use of the clamp of the present invention can now be easily understood. Prior to sharpening the saw teeth on the chain saw, the arm 70 is moved to the retracted position shown in FIG. 2, and the thumbscrew 54 is turned sufficiently to provide space between the backing plate and the thumbscrew for introduction of the saw bar 12 therebetween. The saw bar 12 is placed between the backing plate 36 and the thumbscrew 54, and positioned against the backing plate 36 so that the shoulder 60 on the backing plate 36 supports the saw chain 16 during the sharpening operation without restricting its freedom of movement about the saw bar 12. As best shown in FIG. 3, the thumbscrew 54 is then tightened sufficiently to hold the saw bar 12 in a fixed position relative to the backing plate 36, yet to permit free movement of the saw chain 16.

Subsequently, the arm 70 is lifted to the position shown in FIG. 4 (and in phantom in FIG. 2) so as to engage the saw chain 16 and hold the saw chain 16 in a fixed position relative to the backing plate 36. Such engagement occurs by the abutting of an end 79 of one of the saw teeth 24 against the stop 74 on the end of the arm 70. The saw teeth adjacent the backing plate 36 and supported thereby are sharpened by use of a file 80 drawn across a transverse cutting face 82 on each of the saw teeth 24. Once the saw teeth adjacent the backing plate 36 have been sharpened, the arm 70 is retracted so that the stop 74 is disengagged from the saw chain 16 and no longer prevents movement of the saw chain 16 relative to the backing plate. Movement of the saw chain 16 permits unsharpened saw teeth to be brought into position adjacent the backing plate 36 for sharpening.

Thus, the present invention provides a device for rapidly sharpening the saw teeth of a chain saw without requiring removal of the saw chain from the saw bar. Having described my invention, however, many modifications thereto will become apparent to those skilled in the art to which it pertains, without deviation from the spirit of the invention as defined by the scope of the appended claims.

I claim:

1. A clamp for use in sharpening a saw chain, said saw chain having a plurality of saw teeth each of said teeth having a surface which is transverse to a predetermined direction, said chain movably mounted to a saw bar along said predetermined direction, comprising:

a base;

a pair of opposing jaw members extending upwardly from said base, said base and jaw members forming a channel adapted to receive said saw bar;

a backing plate mounted on one of said jaw members, said backing plate including means for supporting said saw chain during sharpening;

means for fixing the position of said saw bar relative to said backing plate; and means engageable with said saw chain for holding said saw chain in a fixed position relative to said backing plate, wherein said holding means comprises an elongated arm having one end pivotally attached to a mid point the other jaw member about an axis spaced from and substantially parallel to said predetermined direction, said arm being pivotal between a first position in which the other end of said arm is spaced from said saw chain and a second position in which the other end of said arm abuts against said transverse surface of one of said teeth.

2. The clamp as defined in claim 1 wherein said supporting means comprises a recess formed in said backing plate.

3. The clamp as defined in claim 2 wherein said fixing means comprises an elongated threaded member, means on said other jaw member for threadably receiving said threaded member so that, upon rotation of said threaded member, said threaded member moves in a direction perpendicular to said predetermined direction to clampingly engage said saw bar.

4. The clamp as defined in claim 1 and comprising means for pivotally adjustably securing said backing plate to said one jaw member.

* * * * *

UNITED STATES PATENT AND TRADEMARK OFFICE
CERTIFICATE OF CORRECTION

PATENT NO. : 4,503,735

DATED : March 12, 1985

INVENTOR(S) : Robert C. Jackson

It is certified that error appears in the above-identified patent and that said Letters Patent is hereby corrected as shown below:

```
Column 1, line 23 delete "in" insert --is--.
Column 1, line 32 after "disengaged" insert --from--.
Column 2, line 56 after "chain" insert --16--.
Column 3, line 10 after "teeth" insert --24--.
Column 3, line 11 after "saw" insert --16--.
Column 3, line 14 after "plate" insert --36--.
Column 3, line 38 after "plate" insert --36--.
Claim 1, line 2 after "teeth" insert --,--.
```

Signed and Sealed this

Thirteenth Day of August 1985

[SEAL]

Attest:

DONALD J. QUIGG

*Attesting Officer*    *Acting Commissioner of Patents and Trademarks*